(12) United States Patent
Jane Panella et al.

(10) Patent No.: US 9,617,751 B2
(45) Date of Patent: Apr. 11, 2017

(54) WIND TURBINE TOWER SECTION, A WIND TURBINE HAVING SUCH TOWER SECTION AND METHOD FOR FORMING SUCH TOWER SECTION

(71) Applicant: ALSTOM RENEWABLE TECHNOLOGIES, Grenoble (FR)

(72) Inventors: Xavier Jane Panella, Barbera Del Valles (ES); Jose Luis Roman Mallada, Sant Just Desvern (ES); Alberto Gonzalez Del Egido, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 0 days.

(21) Appl. No.: 14/778,555

(22) PCT Filed: Mar. 25, 2014

(86) PCT No.: PCT/EP2014/055895
§ 371 (c)(1),
(2) Date: Sep. 18, 2015

(87) PCT Pub. No.: WO2014/154653
PCT Pub. Date: Oct. 2, 2014

(65) Prior Publication Data
US 2016/0108896 A1    Apr. 21, 2016

(30) Foreign Application Priority Data
Mar. 25, 2013    (EP) ..................................... 13382109

(51) Int. Cl.
*E04H 12/00*    (2006.01)
*E04H 12/34*    (2006.01)
(Continued)

(52) U.S. Cl.
CPC ............... *E04H 12/00* (2013.01); *E04B 1/40* (2013.01); *E04G 3/26* (2013.01); *E04G 21/14* (2013.01);
(Continued)

(58) Field of Classification Search
CPC ........ F03D 11/045; F03D 13/20; F03D 13/22; F03D 1/001; E04B 1/40; E04H 12/00;
(Continued)

(56) References Cited

U.S. PATENT DOCUMENTS 3,839,873 A * 10/1974 Loire ..................... E02B 17/027
405/208
6,116,179 A *  9/2000 Swinbanks ........ B23Q 11/0032
104/293

(Continued)

FOREIGN PATENT DOCUMENTS

EP    1 788 242    5/2007
EP    1 933 029    6/2008
(Continued)

OTHER PUBLICATIONS

International Search Report and Written Opinion for PCT/EP2014/055895, mailed Jun. 26, 2014, 10 pgs.

*Primary Examiner* — Brent W Herring
(74) *Attorney, Agent, or Firm* — Dority & Manning, P.A.

(57) ABSTRACT

It includes at least one platform defining a plane, first and second sets of complementary coupling elements associated with the tower section and the platform respectively, and arranged in levels. In a first relative position of the sets of coupling elements, the platform is allowed to pass, in a substantially horizontal position, through different levels of sets of coupling elements and in a second relative position of the sets of coupling elements, the platform rests with its second set of coupling elements on a first set of coupling (Continued)

elements of one given level. A device for moving the platform may be provided for fitting it inside the tower section. The first or the second set of coupling elements in different levels are aligned along a longitudinal direction inside the tower section.

19 Claims, 12 Drawing Sheets

(51) Int. Cl.
 E04G 21/14 (2006.01)
 E04G 3/26 (2006.01)
 F03D 1/00 (2006.01)
 E04B 1/41 (2006.01)
 F03D 13/20 (2016.01)

(52) U.S. Cl.
 CPC ............. *E04H 12/34* (2013.01); *F03D 1/001* (2013.01); *F03D 13/20* (2016.05); *F03D 13/22* (2016.05); *F05B 2230/60* (2013.01); *F05B 2240/912* (2013.01); *Y02E 10/728* (2013.01); *Y02P 70/523* (2015.11)

(58) Field of Classification Search
 CPC ................ E04H 12/34; F05B 2230/60; F05B 2240/912; Y02P 70/523; Y02E 10/728; E04G 3/26; E04G 21/14
 USPC .............................................. 52/36.4, 745.21
 See application file for complete search history.

(56) References Cited

U.S. PATENT DOCUMENTS

| | | | | |
|---|---|---|---|---|
| 7,762,037 B2* | 7/2010 | Meiners | ............... | E04H 12/085 248/581 |
| 7,775,478 B2* | 8/2010 | Wood | ............... | B64C 1/068 244/119 |
| 8,117,799 B2* | 2/2012 | Kristensen | ............... | E04H 12/34 52/745.04 |
| 8,201,378 B2* | 6/2012 | Meiners | ............... | F03D 13/20 290/55 |
| 8,333,046 B2* | 12/2012 | Hedegaard | ............... | E04G 3/24 52/645 |
| 8,839,586 B2* | 9/2014 | Edenfeld | ............... | E04H 12/34 49/33 |
| 9,057,205 B2* | 6/2015 | Reed | ............... | E04H 12/08 |
| 2007/0125037 A1* | 6/2007 | Meiners | ............... | E04H 12/085 52/848 |
| 2007/0296220 A1 | 12/2007 | Kristensen | | |
| 2009/0126309 A1* | 5/2009 | Lyness | ............... | E04H 12/00 52/650.3 |
| 2009/0236472 A1* | 9/2009 | Wood | ............... | B64C 1/18 244/119 |
| 2010/0139180 A1 | 6/2010 | Meiners | | |
| 2011/0140437 A1* | 6/2011 | Vemuri | ............... | F03D 13/20 290/55 |
| 2011/0140447 A1 | 6/2011 | Paura et al. | | |
| 2011/0173915 A1* | 7/2011 | Hedegaard | ............... | E04G 3/24 52/645 |
| 2011/0203219 A1* | 8/2011 | Kristensen | ............... | E04H 12/34 52/745.17 |
| 2012/0242087 A1* | 9/2012 | Ruder | ............... | F03D 3/061 290/55 |
| 2013/0174508 A1* | 7/2013 | Reed | ............... | E04H 12/08 52/655.1 |
| 2013/0174509 A1* | 7/2013 | Reed | ............... | E04H 12/08 52/655.1 |
| 2014/0075860 A1* | 3/2014 | Edenfeld | ............... | E04H 12/34 52/173.1 |

FOREIGN PATENT DOCUMENTS

| | | |
|---|---|---|
| EP | 2 060 706 | 5/2009 |
| EP | 2 093 417 | 8/2009 |
| EP | 2 108 816 | 10/2009 |
| EP | 2 187 050 | 5/2010 |
| EP | 2 418 383 | 2/2012 |
| WO | WO 2008/000565 | 1/2008 |
| WO | WO 2009/155927 | 12/2009 |
| WO | WO 2010/103114 | 9/2010 |

* cited by examiner

FIG. 1
FIG. 2
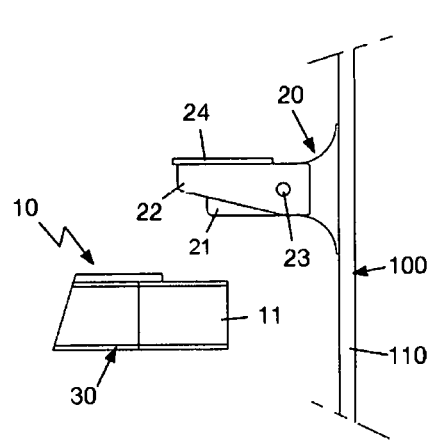
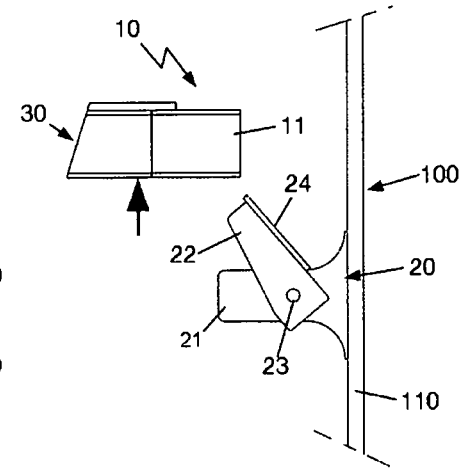
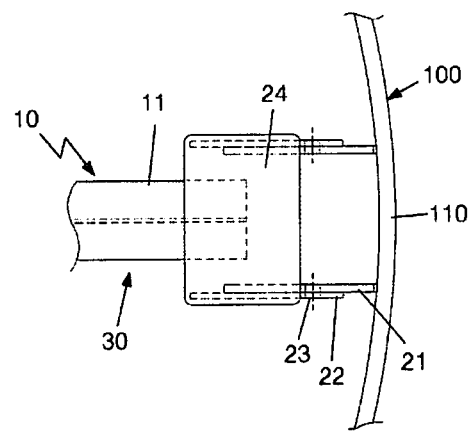
FIG. 3

WIND TURBINE TOWER SECTION, A WIND TURBINE HAVING SUCH TOWER SECTION AND METHOD FOR FORMING SUCH TOWER SECTION

A wind turbine tower section is disclosed herein. The present wind turbine tower section is adapted to receive wind turbine components therein. This tower section includes one or more platforms for supporting said wind turbine components. The platforms can be attached to the tower section.

BACKGROUND

Wind turbine towers both for onshore and offshore applications are usually formed by a number of tubular tower sections. The tower sections are adapted to house a number of operating components of the wind turbine. Examples of wind turbine operating components are electrical power modules, transformer, frequency converter, switch cabinets, inverters, control units, power cables, etc.

Two main problems are associated with tower sections housing operating components.

One problem is the poor accessibility to the components inside the tower sections. Installing equipment inside the tower sections requires hoisting large and heavy operating components at large heights and fitting them inside the tower section. Once the operating components are hoisted at the desired height, they are fitted inside the tower section through openings or doors. Ladders and elevators are used for accessing the inside of the tower section. The equipment is then placed on corresponding platforms that are attached to the inner walls of the tower section. This operation is complex and time consuming due to the limited size of the openings or doors for accessing the inside of the tower section.

Another problem associated with tower sections housing operating components therein is that of safety. It is currently recommended to reduce the presence of operators as much as possible inside a wind turbine tower for installing equipment therein. This is important in order to reduce the risk of falling and other potential dangers that may arise when working inside the tower, especially when working at large heights.

In this respect, alternative ways for installing operating components inside a wind turbine tower have been proposed. For example, according to document EP1788242 at least one platform is placed inside a tower section. The platform is installed from above the tower section. The platform is attached to the inner walls of the tower section. At least one operating component is then disposed on the platform. In one specific embodiment disclosed in this document, multiple groups of supporting elements are provided at the inner side of the tower section for supporting a number of corresponding platforms. The groups of supporting elements are arranged offset with respect to each other in a circumferential direction at different heights. Therefore, when viewed along the longitudinal axis of the tower section, the supporting elements of the individual groups of supporting elements do not overlap each other. Each platform, after being aligned with the supporting elements of the associated group of supporting elements, can be lowered into the tower section without interfering with the supporting element of the respective other groups of supporting elements.

Attaching supporting elements to the tower section offset with respect to each other in a circumferential direction at different points results in a complex and time consuming manufacturing process. Errors in positioning of welding for attachment of the supporting elements may occur and therefore problems in assembling of the platforms inside the tower section.

SUMMARY

A wind turbine tower section adapted to receive wind turbine components therein, comprising: at least one platform defining a plane, and a device for coupling the platform to a wall of the tower section, whereby the device comprises a first set of coupling elements including a number of coupling elements having substantially the same configuration and being associated with the tower section wall, and a second set of coupling elements including a number of coupling elements associated with the platform, and whereby the first set of coupling elements are arranged in levels defining corresponding planes, wherein:—in a first relative position of the first and second sets of coupling elements, the platform is allowed to pass through the different levels of the first set of coupling elements while the platform plane is substantially parallel to, or coincident with the corresponding plane; and—in a second relative position of the first and second sets of coupling elements, the platform rests with its second set of coupling elements on a first set of coupling elements of one given level.

A method for forming a wind turbine tower section, the tower comprising a number of tower sections, each being adapted to at least receive wind turbine components therein, platforms, each defining a plane, and a device for coupling a platform to a wall of a tower section, whereby the device comprises a first set of coupling elements including a number of coupling elements having substantially the same configuration and being associated with the tower section wall, and a second set of coupling elements including a number of coupling elements associated with the platform, whereby the first set of coupling elements are arranged in corresponding planes, wherein:—in a first relative position of the sets of coupling elements, the platform is allowed to pass, through different levels of sets of coupling elements while the platform plane is substantially parallel to, or coincident with the corresponding planes; and—in a second relative position of the sets of coupling elements, the platform rests with its second set of coupling elements on a first set of coupling elements of one given level; wherein the method comprises the steps of:—arranging the platform inside the tower; and—positioning the platform such that the second set of coupling elements rests on a first set of coupling elements.

The present wind turbine tower section is adapted to at least receive wind turbine components therein, such as electrical power modules including transformer, frequency converter, switch cabinets, inverters, control units, power cables, etc.

The present wind turbine tower section includes at least one platform. The platform defines a substantially horizontal plane when assembled inside the wind turbine tower section.

A device for coupling the platform to the tower section are provided in the present wind turbine tower section. Such coupling device may be a temporary or a removable coupling device. Alternatively, the coupling device may be a non-removable coupling device in a way that the platform is fixed to the tower section once it is installed therein.

The coupling device comprises a first set of coupling elements and a second set of coupling elements that may be complementary to each other. The coupling elements are arranged in levels defining corresponding planes. One or more levels of coupling elements may be provided for installing a corresponding number of platforms inside the tower section. In any case, the coupling elements are evenly radially distributed in the corresponding level inside the tower section. The coupling elements in different levels are arranged aligned along a longitudinal direction inside the tower section.

As used herein, coupling is intended to designate the feature that the first set of coupling elements and the second set of coupling elements may be adapted to rest on each other (platform is self-supported inside the tower section), or that they may be adapted to be supported on each other, or that they may be adapted to be held to each other, or that they may be adapted to be joined to each other, or that they may be adapted to fit each other, or in general that they may be capable of cooperating to each other for mounting the corresponding platform inside the tower section at a given level. The platform is arranged in place inside the tower section horizontally.

The first set of coupling elements comprise a number of coupling elements that are associated with the tower section, specifically to the inner side of the wall of the tower section. In one preferred example, the first set of coupling elements may comprise at least three coupling elements such as for example six coupling elements.

The second set of coupling elements includes a number of coupling elements that are associated with the platform. In one preferred example, the second set of coupling elements may comprise at least three coupling elements such as for example six coupling elements.

The coupling elements of at least one of the first and second sets of coupling elements have substantially the same configuration.

As stated above, each of first and second sets of coupling elements are arranged in levels in corresponding planes substantially parallel to o coincident with the plane of the platform, e.g. substantially horizontal planes. In a given tower section, one or more levels of sets of coupling elements may be provided.

At least two different relative positions may be assumed by the first and second sets of coupling elements. In a first relative position of the sets of coupling elements the platform is allowed to pass, in a substantially horizontal position, through at least one level of sets of coupling elements. This involves that the first set of coupling elements or the second set of coupling elements can assume a first relative position in which there is no interference between them allowing the platform to pass through one or more levels of the sets of coupling elements freely in a substantially horizontal position until the platform reaches the desired level within the tower section. The latter occurs when there is interference between the first set of coupling elements and the second set of coupling elements. This would correspond to a different, second relative position of the sets of coupling elements in which the platform rests with its second set of coupling elements on a first set of coupling elements of one given level inside the tower section.

A number of embodiments are possible according to the above main configuration. In a first example, the first set of coupling elements are fixed to the tower section while the second set of coupling elements are fixed to the platform. In a second example, the first set of coupling elements are fixed to the tower section while the second set of coupling elements are movable to the platform. In this case, there may be embodiments where the second set of coupling elements are pivotable, either around a horizontal axis or in the plane of the platform. Also in this case, the second set of coupling elements may be displaceable to the platform such that in one position the second set of coupling elements may protrude from the platform towards the tower section inner wall. In a third example, the first set of coupling elements may be movable to the tower section while the second set of coupling elements may be movable to the platform.

As stated above, coupling of the platform may involve that the platform may be self-supported for example resting on the coupling elements associated with the inner side of the wall of the tower section. However, within the present concept, when the platform is already placed horizontally inside the tower, it may be attached in any suitable manner.

The above may be carried out for example by providing at least one harpoon like element. This harpoon like element may be part of at least one of the first and second sets of coupling elements. The harpoon like elements may comprise two mutually pivotable wing like parts capable of moving closer to each other to the above mentioned first relative position of the sets of coupling elements such that the platform is allowed to pass, in a substantially horizontal position, through all the levels of sets of coupling elements of the tower section. The two mutually pivotable wing like parts of the harpoon like elements may be also capable of moving away from each other to the above mentioned second relative position of the sets of coupling elements such that the platform rests with its second set of coupling elements on a first set of coupling elements of one given level. In this respect, the harpoon like elements may be associated with one of the first and second sets of coupling elements and capable of being attached to the other of the first and second sets of coupling elements. In some embodiments, the harpoon like element may be adapted of being either automatically or selectively attached to at least one of the first and second sets of coupling elements. In the first case, the harpoon like element may be adapted of being automatically attached to at least one of the first and second sets of coupling elements through the use of a spring element acting on the wing like parts of the harpoon like elements tending to move said wing like parts away from each other. In the second case, the harpoon like element may be adapted of being selectively attached to at least one of the first and second sets of coupling elements through the use of an actuator such as a hydraulic actuator acting on the wing like parts of the harpoon like elements causing to selectively move said wing like parts closer to and/or away from each other.

Still in some embodiments of the device for coupling the platform to the tower section they may include at least one magnet. Such magnet is capable of keeping the first and second sets of coupling elements mutually attached when the platform is arranged inside the tower section at the desired level. The magnet may be of the type that it is active when an electrical current does not flow through a magnet coil.

A device for moving the platform for placing it inside the tower section may be provided. Such device for moving the platform may be for example an elevator or the like adapted for pushing the platform upwards into the tower section and placing it at a given height inside the tower section. Additionally or alternatively the device for moving the platform may be adapted for pulling the platform for allowing it to descend downwards into the tower section. In any case, the device for moving the platform may be a temporary device.

A wind turbine is also disclosed herein comprising a tower, a nacelle disposed at the upper portion of the tower, and a rotor coupled to a generator fitted within the nacelle.

The tower of the wind turbine supports the nacelle, the rotor, and other components housed inside the nacelle. The tower of the wind turbine also houses operating components of the wind turbine therein such as electrical power modules, frequency converter, switch cabinets, inverters, control units, power cables, etc. The tower of the wind turbine is divided into tower sections, such as for example three tower sections. A least one of the tower sections, for example the lower tower section, is the tower sections as described above.

A method for forming a wind turbine tower comprising at least one of the above defined tower sections is also provided. This method comprises providing a tower section and at least one platform to be fitted therein. The platform has operating equipment already fitted therein when the platform is installed inside the tower section. The platform may be installed inside the tower section either from the bottom or from the top of the tower section. Finally, the platform is positioned such that second set of coupling elements rests on the first set of coupling elements.

In some cases it may be required that the platform is rotated for positioning the platform inside the tower section such that the second set of coupling elements rests on the corresponding first set of coupling elements.

With the above method for forming a tower section the assembly process is very fast and easy and provides high flexibility in terms of assembly options. However, the most important advantage is that risks of accident are dramatically reduced particularly during manufacturing, assembling, installation and maintenance operations inside the tower section.

Additional objects, advantages and features of embodiments of the present tower section, method for forming it and wind turbine having a tower including such tower section will become apparent to those skilled in the art upon examination of the description, or may be learned by practice thereof.

BRIEF DESCRIPTION OF THE DRAWINGS

Particular embodiments of the present tower section will be described in the following by way of non-limiting examples, with reference to the appended drawings, in which:

FIG. 1 is an elevational part view showing a first embodiment of a portion of the present tower section depicting a coupling element of the first set of coupling elements associated with the tower section, and part of one coupling element of the second set of coupling elements associated with the platform, with said coupling elements shown in a first relative position where the coupling elements of the second set, and therefore the platform, is allowed to pass upwards through the coupling elements of the first set;

FIG. 2 is an elevational part view showing the coupling elements in FIG. 1 but in a second relative position where the coupling elements of the second set rest on the coupling elements of the first set such that the platform is supported in position;

FIG. 3 is a fragmentary top plan view of the tower section shown in FIGS. 1 and 2;

DETAILED DESCRIPTION OF EMBODIMENTS

Figure 4:
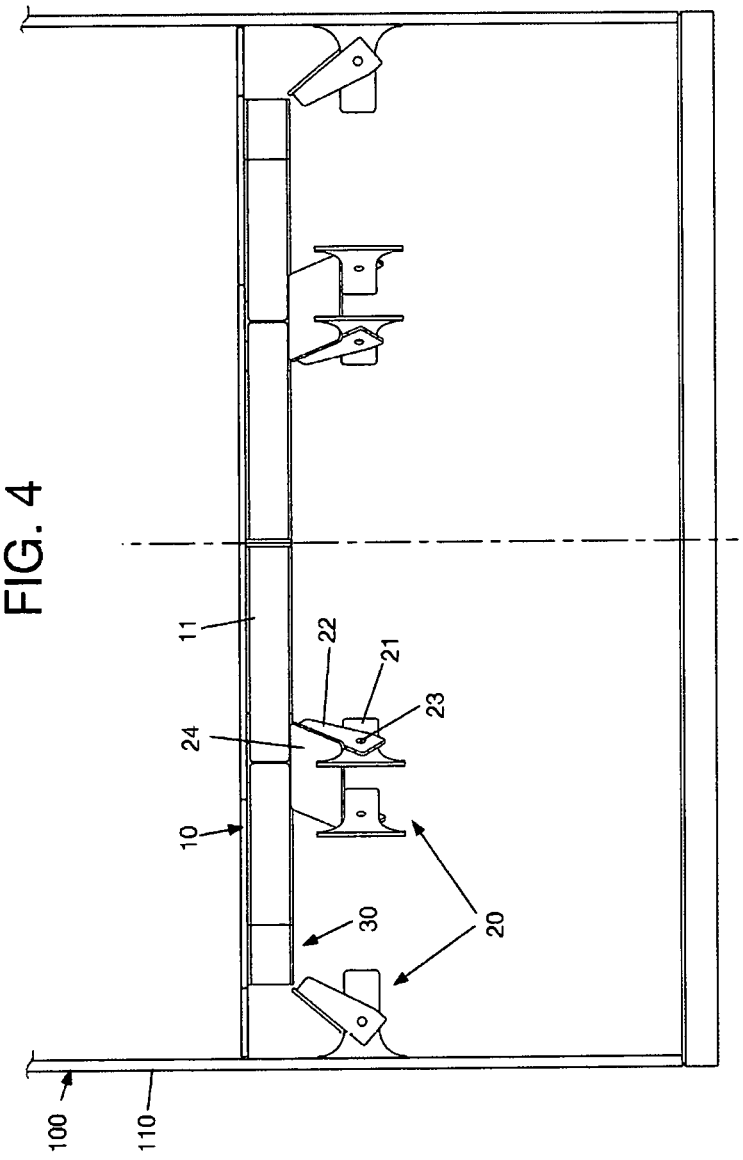
FIGS. 4 and 5 are perspective views of the tower section shown in FIGS. 1 and 2.

A number of embodiments of the present wind turbine tower section will be now disclosed. Like reference numerals refer to like parts throughout this description of the different views of the drawings.

Figure 16:
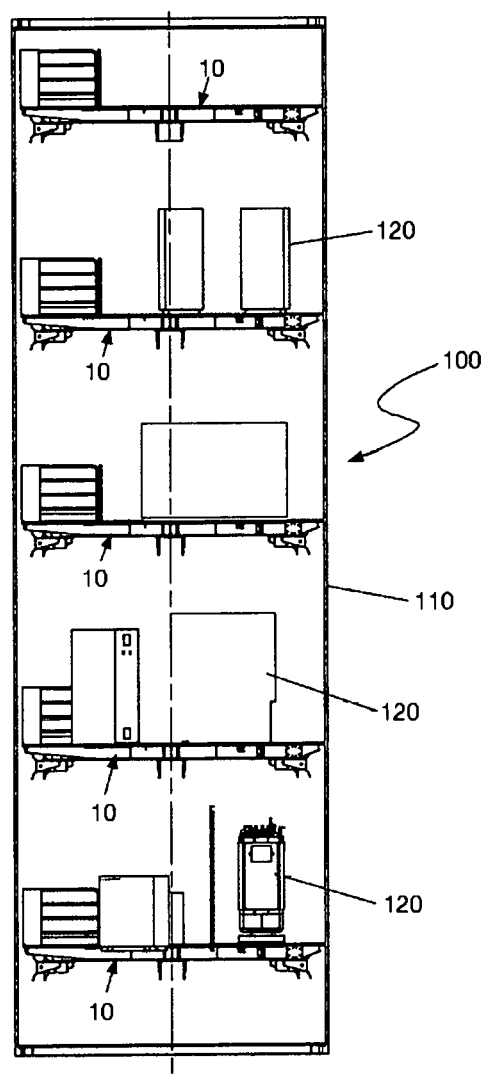
FIG. 16 is a general elevational view of a tower section having a plurality of platforms coupled according to the embodiments shown in FIGS. 1 to 5c.
Figure 17:
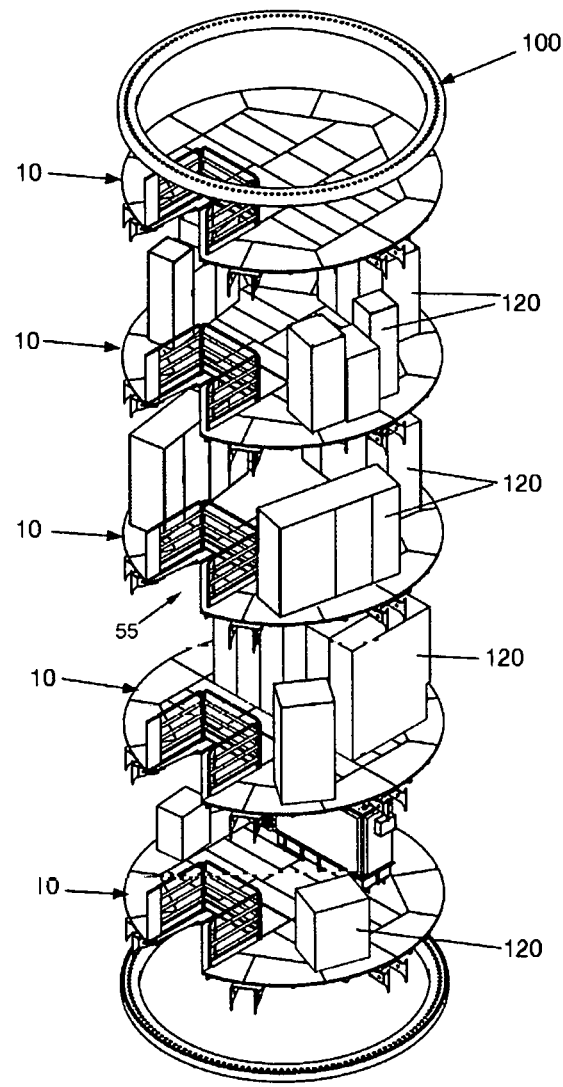
FIG. 17 is a perspective view of the plurality of platforms shown in FIG. 16 where the tower section has been diagrammatically depicted for the sake of clarity.

One example of a wind turbine tower section 100 is shown in FIGS. 16 and 17 of the drawings. The tower section 100 generally comprises walls 110 adapted to support one or more platforms 10. The platforms 10 comprise a frame formed by a number of beams 11 as shown in FIGS. 5, 9, 10 and 11 defining a substantially horizontal surface or plane when assembled inside the wind turbine tower section 100. The structure of the platform 10 is adapted to receive wind turbine components 120 therein. The turbine components 120 may be, for example, electrical power modules, transformer, frequency converter, switch cabinets, inverters, control units, power cables, etc.

The platforms 10 are coupled to the walls 110 of the tower section 100 through a suitable coupling device at different levels defining corresponding planes. The coupling device may be temporary or removable, or it may be a non-removable device such that the platform 10 is permanently fixed or attached to the tower section wall 110 once installed.

The coupling device comprises a first set of coupling elements 20 and a second set of coupling elements 30. The coupling elements 20, 30 are arranged at different levels inside the tower section 100 as stated above. For example, in the embodiments in FIGS. 16 and 17 five levels are provided.

The first set of coupling elements 20 comprises coupling elements that are associated with the inner side walls 110 of the tower section 100. The second set of coupling elements 30 comprises coupling elements associated with the platforms 10. In the examples shown, the second set of coupling elements 30 are the end of the beams 11 defining the frame of the platforms 10. In the embodiments shown in FIGS. 5, 9, 10 and 11 the first and second sets of coupling elements 20, 30 each comprise six coupling elements having substantially the same configuration. However, any number of coupling elements 20, 30 equal to or greater than three may be used.

Coupling herein means that the first and second sets of coupling elements 20, 30 rest on the each other, that is, with the platform self-supported inside the tower section 100 on the first sets of coupling elements 20, or that the first and second sets of coupling elements 20, 30 are supported on each other, or that they are adapted to be held to each other, or that they are adapted to be joined to each other, or that they are adapted to fit each other, or in general that they are capable of cooperating to each other for mounting the corresponding platform 10 inside the tower section 100 at a given level. In all the present embodiments, the platforms 10 are always arranged in place inside the tower section 100 horizontally.

The first and second sets of coupling elements 20, 30 are evenly radially distributed in corresponding levels both in the end side of the walls 110 of the tower section 100 and in the end of the platforms 10. The first and second sets of coupling elements 20, 30 allow the platforms 10 to be installed inside the tower section 100. The first and second sets of coupling elements 20, 30 are mutually complementary such that they can rest on each other.

The first and second sets of coupling elements 20, 30 may change their relative positions in order to install the platform 10 in the desired level inside the tower section 100. At least two different relative positions can be defined. In a first relative position of the sets of coupling elements 20, 30, the platform 10 is allowed to pass, in a substantially horizontal position, through one or more levels inside the tower section 100. As stated above, each level corresponds to a plane defined by the first or the second set of coupling elements 20, 30. In the above mentioned first relative position, there is no interference between the first and the second set of coupling elements 20, 30 so that the platform 10 is allowed to pass in a horizontal position through the inside of the tower section 100 until the platform 10 reaches a desired level inside the tower section 100. When the desired level has been reached, interference between the first set of coupling elements 20 and the second set of coupling elements 30 exists. This corresponds to a different, second relative position in which the platform 10 rests with its second set of coupling elements 30 on the corresponding first set of coupling elements 20 of one given level.

Figure 5:
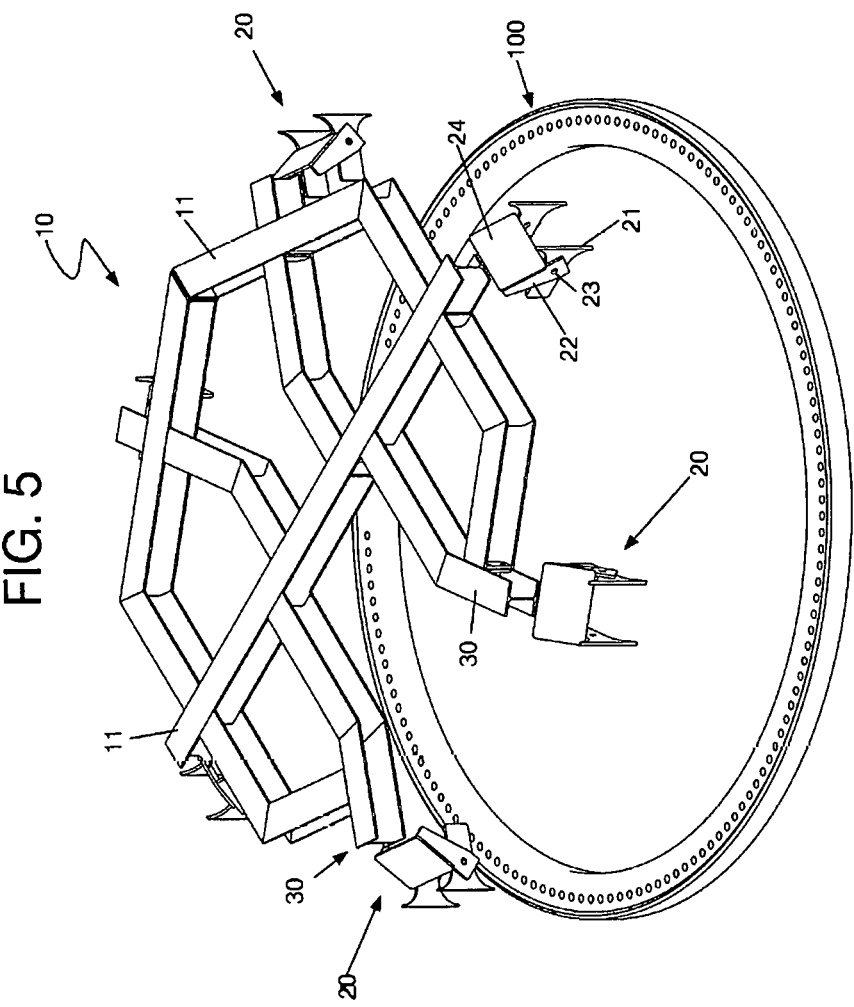

Reference is now made to FIGS. 1 to 5c of the drawings showing a first embodiment of the present tower section 100. In this particular embodiment of the present tower section 100, which can be referred to as of the swing type, the first set of coupling elements 20 are fixed to the inner side of the wall 110 of the tower section 100. The second set of coupling elements 30 correspond to the end of the beam 11 of the platform 10, which has been shown partially in FIGS. 1-3. The coupling elements of the first set 20 comprise a first section 21 and a second section 22. The first section 21 is fixed, e.g. welded, to the inner side of the wall 110 of the tower section 100. The second section 22 of the coupling elements of the first set 20 is pivotable to the first section 21 around a pivot point 23. A plate 24 is attached to an upper portion of the second section 22 as shown in FIGS. 1-3 of the drawings. As shown in FIGS. 3, 4 and 5, the second section 22 comprises two parallel side arms one end of which is attached to the inner side of the wall 110 of the tower section 100. The above mentioned pivot point 23 is defined in an intermediate portion of the arms of the second section 22 on which the first section 21 is pivotably joined. The parallel arms of the second section 22 are spaced apart by a distance suitable such that a coupling element of the second set of coupling elements 30 passes through.

In this embodiment shown in FIGS. 1 to 5c of the drawings, the platform 10 is hoisted from the bottom of the inside of the tower section 100. The platform 10 is hoisted vertically in a horizontal position with the wind turbine components 120 mounted therein. The platform 10 with the wind turbine components 120 is hoisted passing through one or more levels of coupling elements 20. This causes the plate 24 of the first set of coupling elements in each level to be pushed upwards causing the arms of the second section 22 to be pivoted around pivot points 23 clockwise as shown. This occurs as the coupling element of the second set of coupling elements 30, that is, the end of the beam 11 of the frame structure of the platform 10, passes between the arms of the second section 22. When the platform 10 has reached the desired level inside the tower section 100, the platform 10 is not hoisted anymore and is left arranged with the coupling elements of the second set 30, specifically the end of the beams 11 of the platform frame structure, resting on the corresponding plate 24 of the coupling elements of the first set 20. In this position, the platform 10 is self-supported horizontally as the arms of the second section 22 of the first set 20 of coupling elements are not allowed to be rotated counterclockwise beyond the horizontal position shown in FIG. 1.

Figure 5A:
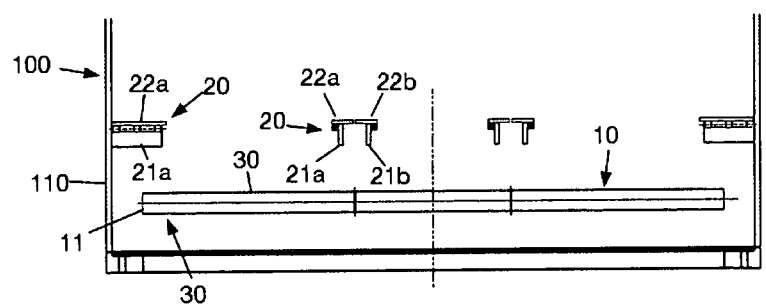
FIGS. 5a, 5b, 5c are elevational views of a variant of the embodiment of the present tower section shown in FIGS. 1-5 depicting different platform installing steps from the bottom of the tower section.
Figure 5B:
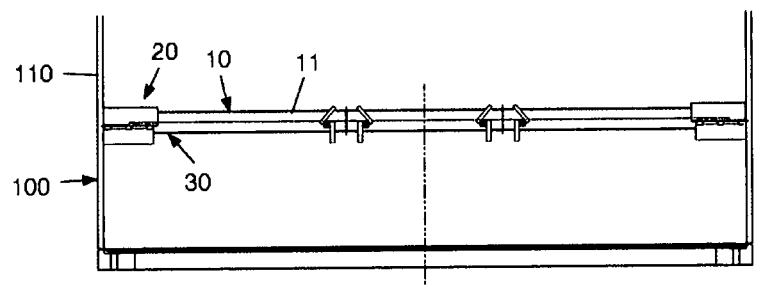
Figure 5C:
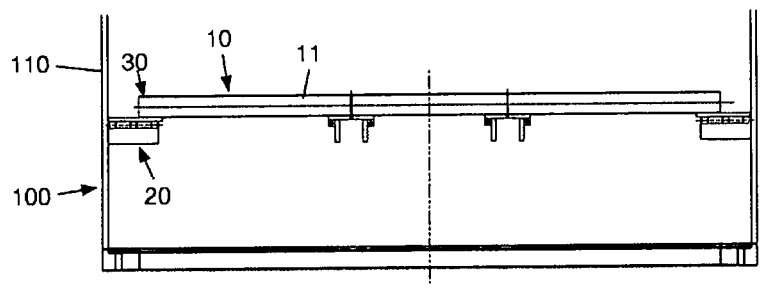

Reference is now made to FIGS. 5a to 5c of the drawings. In this variant, the coupling elements of the first set 20 comprises fixed vertical sections 21a, 21b arranged parallel to each other and pivotable sections 22a, 22b. The sections 22a, 22b can be rotated to the fixed vertical sections 21a, 21b. In one position, the pivotable sections 22a, 22b are arranged at right angles to the fixed vertical sections 21a, 21b such that both pivotable sections 22a, 22b define a plane equivalent to the plate 24 in the above embodiment describe with reference to FIGS. 1-5. The fixed vertical sections 21a, 21b are e.g. welded to the inner side of the wall 110 of the tower section 100. The fixed vertical sections 21a, 21b are arranged substantially parallel to each other and spaced apart by a distance suitable for the coupling elements of the second set of coupling elements 30, that is, the end of the beams 11 of the platform frame structure to pass through.

In this case, the platform 10 is also hoisted from the bottom of the inside of the tower section 100 vertically in a horizontal position passing through one or more levels of coupling elements 20. This causes the end of the beam 11 of the frame structure of the platform 10 to pass between the fixed vertical sections 21a, 21b pushing the pivotable sections 22a, 22b causing them to be pivoted to the fixed sections 21a, 21b. When the platform 10 has reached the desired level inside the tower section 100, the platform 10 is not hoisted anymore and it is left arranged with the coupling element of the second set of coupling elements 30, that is, the end of the beams 11 of the platform frame structure, on the corresponding coupling element of the first set 20, that is, on the pivotable sections 22a, 22b at the desired level inside the tower section 100. In this position, the platform 10 is self-supported horizontally as said pivotable sections 22a, 22b are not allowed to be rotated beyond the horizontal position shown in FIGS. 5a-5c.

Figure 6:
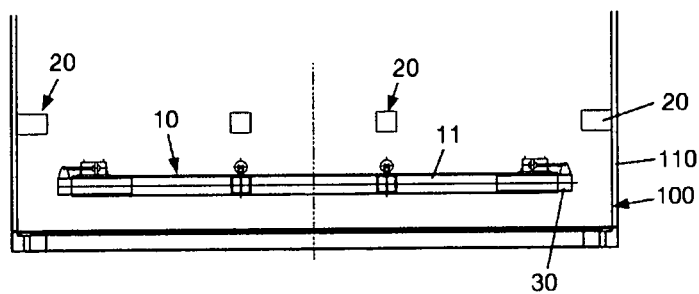
FIGS. 6, 7, and 8 are elevational views showing a second embodiment of the present tower section depicting different platform installing steps from the bottom of the tower section.
Figure 7:
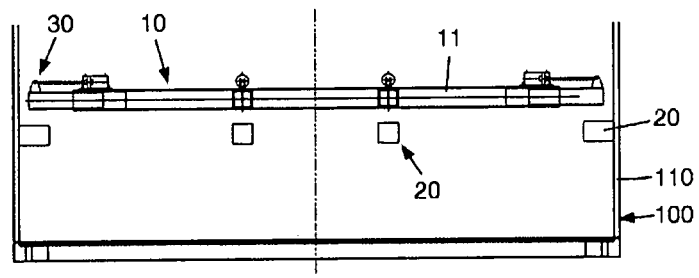
Figure 8:
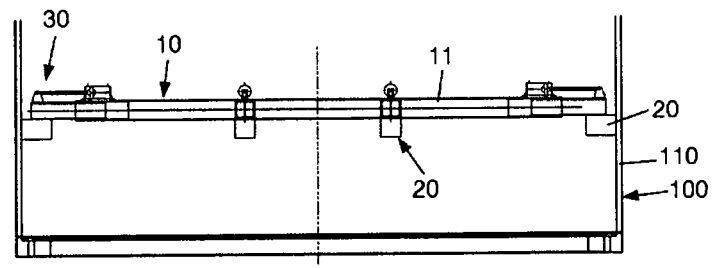

Reference is now made to FIGS. 6, 7 and 8 of the drawings. In this particular embodiment, the first set of coupling elements 20 are fixed to the inner side of the wall 110 of the tower section 100 while the second set of coupling elements 30 are movable to the platform 10. Specifically, the second set of coupling elements 30, that is the end of beams 11 of the platform frame structure, are displaceable lengthwise by means of corresponding actuators 40. The actuators 40 comprise a driving end that is attached to the end of beams 11 of the platform frame structure or attached to a portion of the coupling element of the second set of coupling elements 30 of the platform 10 slightly distanced from said end of the beams 11. The actuators 40 are for example hydraulic actuators adapted to drive the second set of coupling elements 30. The actuators 40 are designed such that in one first position the second set of coupling elements 30 protrude from the platform 10 towards the tower section inner wall 110 and in a second position the second set of coupling elements 30 retract to the platform 10.

In this case, the platform 10 can be either hoisted upwards from the bottom of the inside of the tower section 100 vertically in a horizontal position or lowered downwards from the top of the tower section 100 inside the tower section 100. In the second, retracted position of the second set of coupling elements 30 of the platform, the platform 10 is allowed to pass through one or more levels of coupling elements 20 inside the tower section 100. When a desired level has been reached inside the tower section 100, the actuators 40 drive the second set of coupling elements 30 such that they protrude from the platform 10 in a way that the end of the beams 11 of the platform frame structure rests on the coupling elements of the first set 20 in said desired level. In this position, the platform 10 is self-supported horizontally with the wind turbine components 120 therein.

Figure 9:
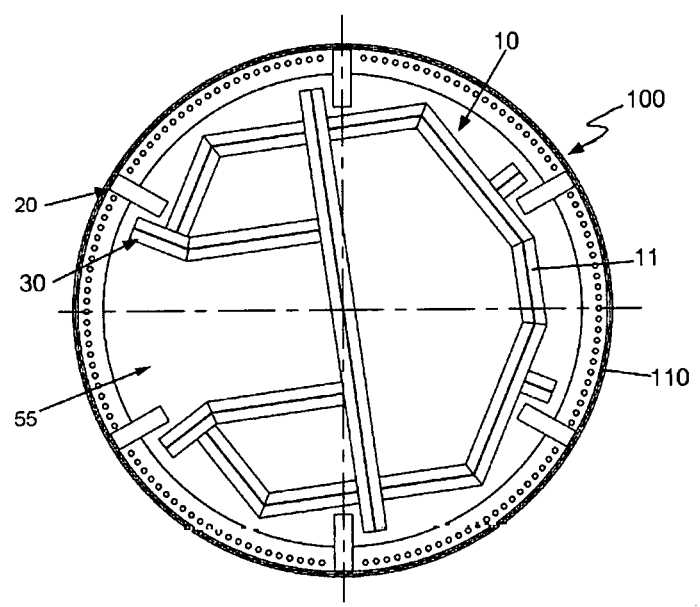
FIG. 9 is a top plan view of a third embodiment of the present tower section with the coupling elements shown in a first relative position where the platform is allowed to pass through the first set of coupling elements.
Figure 10:
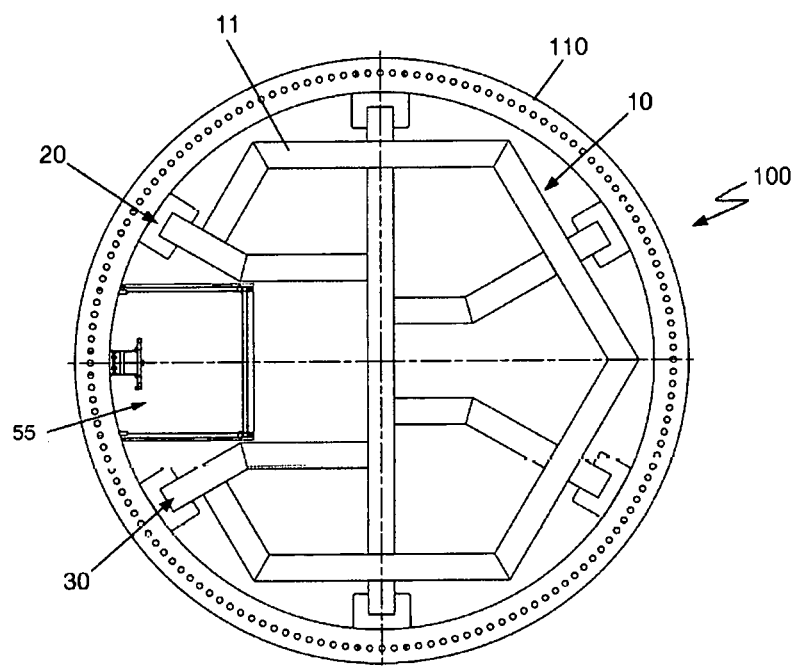
FIGS. 10 and 11 are top plan views of the tower section shown in FIG. 9 but with the platform already mounted, with the coupling elements in a second relative position where the coupling elements of the second set rest on the coupling elements of the first set.
Figure 11:
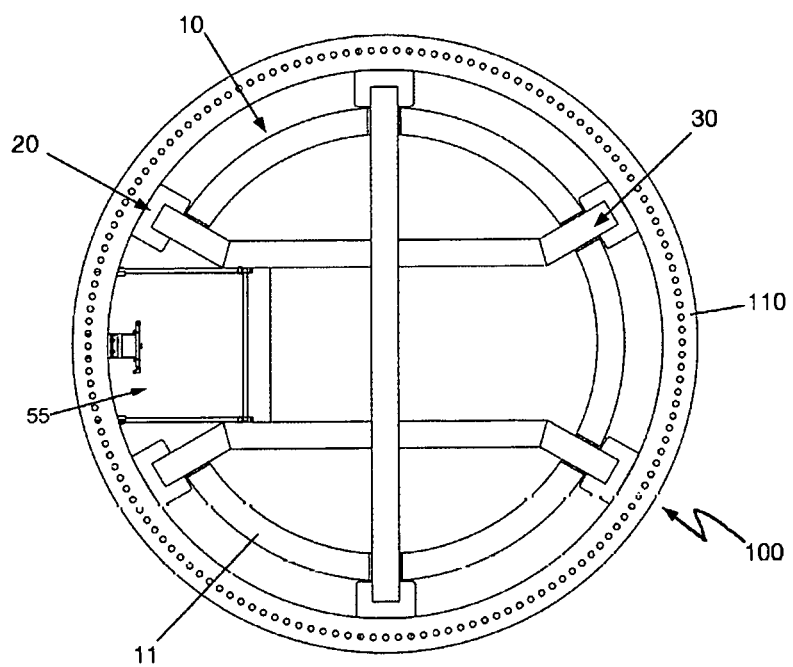
Figure 12:
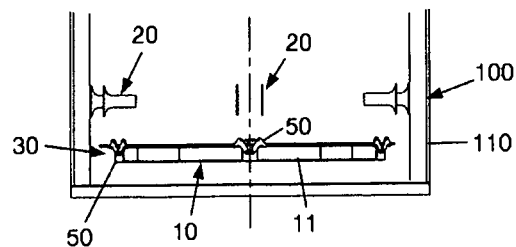
FIGS. 12-15 are elevational views showing a fourth embodiment of the present tower section depicting different platform installing steps from the bottom of the tower section.
Figure 13:
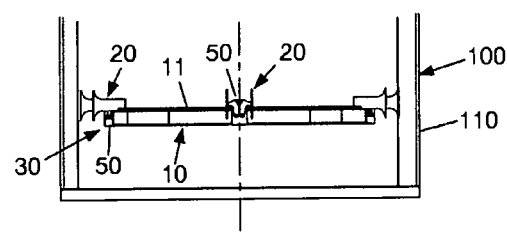
Figure 14:
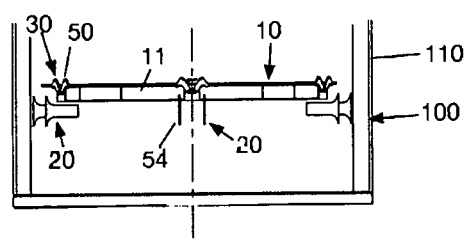

Reference is now made to FIGS. 9-11 of the drawings. In this particular case, the first and second sets of coupling elements 20, 30 do not have any movable parts. The first set of coupling elements 20 comprise coupling elements that are fixed to the inner side of the wall 110 of the tower section 100 and the second set of coupling elements 30 comprise coupling elements that are fixed to platform 10.

In FIGS. 9 and 10, the platform frame structure comprises beams 11 arranged in a substantially hexagonal configuration while in FIG. 11 the platform frame structure comprises beams 11 arranged in a circular configuration. In all of the embodiments, suitable room 55 for ladders and/or elevators is provided.

In the embodiment of FIGS. 9-11 of the drawings, the platform 10 can be either hoisted upwards from the bottom of the inside of the tower section 100 vertically in a horizontal position or lowered downwards from the top of the tower section 100 inside the tower section 100. In both cases, the platform 10 can be passed freely through different levels of coupling elements 20 in one relative rotational position of the first and second sets of coupling elements 20, 30. When a desired level has been reached inside the tower section 100, the platform 10 is caused to rotate around a vertical axis until a second, different relative rotational position of the first and second sets of coupling elements 20, 30 is reached. In this second relative rotational position of the sets of coupling elements 20, 30 there is interference between them such that the end of the beams 11 of the platform frame structure rests on the corresponding coupling elements of the first set 20 in said desired level. In this position, the platform 10 is self-supported horizontally.

Reference is now made to FIGS. 12-15*a* of the drawings. In this specific embodiment of the present tower section 100, harpoon like elements 50 are provided. The harpoon like elements 50 are part of the second set of coupling elements 30, that is, they are associated with the platform 10. As clearly shown in FIG. 15*a*, the harpoon like elements 50 comprise two mutually pivotable opposite wing like parts 51, 52. The opposite wing like parts 51, 52 of the harpoon like elements 50 may be rotated about corresponding pivot points 51*a*, 52*a*, moving closer to or away from each other. A biasing element such as a spring 53 are provided between the wing like parts 51, 52. The spring 53 tends to push the wing like parts 51, 52 away from each other.

Figure 15:
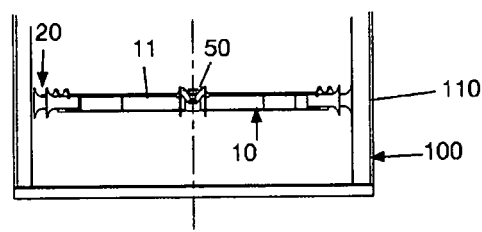
Figure 15A:
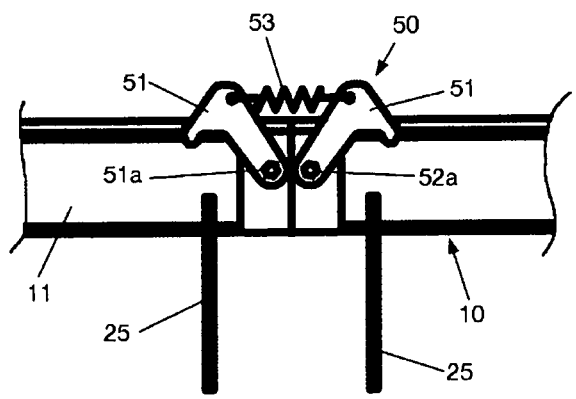
FIG. 15a is an enlarged elevational view showing one example of a harpoon like element in detail.

Referring particularly to FIGS. 12-15, the platform 10 is hoisted upwards from the bottom of the inside of the tower section 100 vertically with the platform 10 kept horizontal with the wind turbine components 120 mounted therein. As the platform 10 is hoisted upwards, the wing like parts 51, 52 of the harpoon like elements 50 pass through between vertical parallel wall members 25 that are provided in the first set of coupling elements 20 as shown in FIG. 15*a*. As the wing like parts 51, 52 of the harpoon like elements 50 pass through such wall members 25 the wing like parts 51, 52 are caused to come closer to each other against the force of the spring 53, with the wing like parts 51, 52 sliding on the inner sides of the wall members 25. As soon as the upper portion of the wing like parts 51, 52 comes out of the wall members 25, the wing like parts 51, 52 are mutually rapidly separated and project beyond the wall members 25 in a given level inside the tower section 100. Then, the platform 10 is not hoisted anymore and it is retained in position, with the second set of coupling elements 30, in this case the harpoon like elements 50, coupled on the first set of coupling elements 20, in this case the wall members 25.

Hoisting and lowering operations may be performed through a suitable device for moving the platform 10. Such device, not shown in the drawings, may be a crane or elevator adapted for hoisting and lowering the platform 10 at a given height or level inside the tower section 100 and even for rotating the platform 10 if required (embodiment of FIG. 9), with the operating components 120 fitted therein (electrical power modules, transformer, frequency converter, switch cabinets, inverters, control units, power cables, etc.) The device for moving the platform 10 may be temporary.

In general, the method for assembling the tower section 100 and mounting the platforms 10 therein can be performed as follows.

A tower section 100 is first placed in vertical position. Then, different operating components 120 such as electrical power modules, transformer, frequency converter, inverters, switch cabinets, power cables, control units, etc. are attached to the platform 10, out of the tower section 100. Then, said platform 10 is hoisted, for example by means of a bridge crane, to the top of the tower section 100. The platform 10 with the operating components 120 therein is then lowered inside the tower section 100 and coupled at the desired level as stated in any of the above mentioned embodiments.

In one alternative method for assembling the tower section 100 and mounting the platforms 10 therein, the tower section 100 is first placed in vertical position. Then, the operating components 120 are attached to the platform 10, out of the tower section 100. Then the platform 10 is moved horizontally, for example by means of rails (e.g. in an automated manner) until it is placed at the centre of the bottom of the tower section 100, under a support structure that supports the tower section 100. The platform 10 with the operating components 120 therein can then enter the tower section 100 from one side thereof and be hoisted by means of a bridge crane or by means of an elevator to the top of the tower section 100 at the desired level as stated in any of the above mentioned embodiments.

A number of particular embodiments and examples of the present wind turbine tower section 100 have been disclosed herein. However, those skilled in the art will realise that many other alternative embodiments and/or uses and obvious modifications and equivalents thereof are possible.

The above described operations for mounting the platforms 10 in order to assemble the present tower section 100 can be repeated as required for installing a number of platforms 10 inside the tower section 100 in different levels such that they are mounted as modules. In any case, the purpose is assembling one or a number of platforms 10 inside the tower section 100 such that they are self-supported or attached without requiring assistance of operators avoiding risks specially those involved in handling large and heavy operating components 120 at large heights inside the tower section 100.

Many other alternatives are possible within the scope of the claims. For example, the first set of coupling elements 20 could be fixed to the inner side of the walls 110 of the tower section 100, while the second set of coupling elements 30 could be movable to the platform 10. In any case, the first of second sets of coupling elements 20, 30 could be alternatively arranged such that they are pivotable around a vertical axis, that is, they could be arranged to rotate in a horizontal plane.

In a further possible example, the harpoon like elements 50 could be associated with the first set of coupling elements 20 of the tower 100 and capable of being attached to the second set of coupling elements 30 of the platform 10. In any case, the harpoon like elements 50 could include an actuator such as a hydraulic actuator instead of or in combination with the spring 53 as stated above. The actuator in this case could be arranged to act on the wing like parts 51, 52 for selectively moving them closer and away from each other in order to attach the platform 10 to the tower section 100 at the desired level.

Still a further possible example, the means for coupling the platform 10 to the tower section 100 could include at least one magnet. The magnet or magnets should be capable of keeping the first and second sets of coupling elements 20, 30 mutually attached when the platform 10 is coupled within the tower section 100 at the desired level. In this case, a magnet or magnets could be of the type that it is active when an electric current does not flow through a magnet coil.

In some embodiments, the platform 10 could be fixed to the tower section 100 once it has been coupled thereto. Fixation of the platform 10 can be carried out for example through screws attaching the second coupling elements 30 to the first coupling elements 20. Other suitable known fixing means could be of course used.

Finally, the wind turbine disclosed herein provided with the present tower section is not limited to a particular type of wind turbine. The present tower section can be applied for example both to onshore and offshore wind turbines.

Therefore, the present disclosure covers all possible combinations of the particular embodiments described herein.

Reference signs related to drawings and placed in parentheses in a claim are solely for attempting to increase the intelligibility of the claim, and shall not be construed as limiting its scope. Thus, the scope of the present disclosure should not be limited by particular embodiments but should be determined only by a fair reading of the following claims.

The invention claimed is:

1. A wind turbine tower section adapted to receive wind turbine components therein, comprising:
   at least one platform defining a plane, and
   a device for coupling the platform to a wall of the tower section, whereby the device comprises a first set of coupling elements having substantially the same configuration and being associated with the tower section wall, and a second set of coupling elements associated with the platform, wherein at least one of the first or second sets of coupling elements comprises a pivotable element, and whereby the first set of coupling elements are arranged in levels on the tower section wall defining different corresponding planes, wherein:
   in a first pivoted relative position of the pivotable element, the platform is allowed to pass from below through the different levels of the first set of coupling elements while the platform plane is substantially parallel to, or coincident with the corresponding plane defined by the first set of coupling elements at the respective level; and
   in a second pivoted relative position of the pivotable element, the platform rests with its second set of coupling elements in engagement with the first set of coupling elements at the respective level such that the platform is fully supported relative to the tower section wall by the pivotable element.

2. The tower section of claim 1, wherein the first set of coupling elements is fixed to the tower section wall and the second set of coupling elements comprises the pivotal element the pivots relative to the platform.

3. The tower section of claim 1, wherein the first set of coupling elements comprises the pivotable element that pivots relative to the tower section wall and the second set of coupling elements is fixed on the platform.

4. The tower section of claim 3, wherein the first set of coupling elements is radially pivotable within the plane of the platform.

5. The tower section of claim 1, wherein the non-pivotal one of the first or second sets of coupling elements is displaceable relative to the corresponding plane defined by the first set of coupling elements.

6. The tower section of claim 1, wherein one of the first or second sets of coupling elements comprises a harpoon like element capable of being attached to the other of the first or second sets of coupling elements.

7. The tower section of claim 6, wherein the harpoon like element is adapted for being selectively attached to the first or second sets of coupling elements.

8. The tower section of claim 1, wherein the device for coupling the platform includes at least one magnet capable of keeping the first and second sets of coupling elements mutually attached.

9. The tower section of claim 1, wherein the tower section comprises a number of platforms arranged in corresponding levels of the first and second sets of coupling elements.

10. The tower section of claim 1, wherein the tower section further includes a second device for moving the platform for purposes of fitting the platform to the tower section wall.

11. The tower section of claim 10, wherein the second device for moving the platform is adapted for moving the platform and placing it on the tower section wall at a given height inside the tower section.

12. The tower section of claim 11, wherein the second device is temporary.

13. The tower section of claim 1, wherein the first and second sets of coupling elements comprises at least three respective coupling elements radially distributed at each level of the tower section wall and on each platform.

14. The tower section of claim 1, wherein the first set of coupling elements is complementary to the second set of coupling elements.

15. The tower section of claim 1, wherein the first set of coupling elements in the different levels are aligned along a longitudinal direction inside the tower section.

16. A wind turbine comprising a tower including at least one tower section adapted to at least receive wind turbine components therein, at least one platform defining a plane, and a device for coupling the platform to a wall of the tower section, whereby the device comprises a first set of coupling elements having substantially the same configuration and being associated with the tower section wall, and a second set of coupling associated with the platform, wherein at least one of the first or second sets of coupling elements comprises a pivotable element, and whereby the first set of coupling elements are arranged in corresponding planes on the tower section wall, wherein:

in a first relative pivoted position of the pivotable element, the platform is allowed to pass from below through different levels of the second sets of coupling elements while the platform plane is substantially parallel to, or coincident with the corresponding planes; and in a second relative pivoted position of the pivotable element, the platform rests with its second set of coupling elements engaged with a first set of coupling elements of one given level such that the platform is fully supported relative to the tower section wall by the pivotable element.

17. The wind turbine of claim 16, wherein the tower section is a lower section of the tower.

18. A method for forming a wind turbine tower, the tower comprising a number of tower sections, each being adapted to at least receive wind turbine components therein, each defining a plane, and a device for coupling a platform to a wall of the tower section whereby the device comprises a first set of coupling elements having substantially the same configuration and being associated with the tower section wall, and a second set of coupling elements associated with the platform, wherein at least one of the first or second sets of coupling elements comprises a pivotable element, and whereby the first set of coupling elements are arranged in corresponding planes, wherein:

in a first relative pivoted position of the pivotable element, the platform is allowed to pass from below through different levels of the second sets of coupling elements while the platform plane is substantially parallel to, or coincident with the corresponding planes; and in a second relative pivoted position of the pivotable, elment, the platform rests with its second set of coupling elements engaged with a first set of coupling elements of one given level;

wherein the method comprises the steps of:
arranging the platform inside the tower; and
positioning the platform such that the second set of coupling elements is engaged with a first set of coupling elements such that the platform is fully supported relative to the tower section wall by the pivotable element.

19. The method of claim 18, wherein arranging the platform inside the tower is carried out by hoisting the platform from a bottom of the tower.

* * * * *